United States Patent Office 3,287,230
Patented Nov. 22, 1966

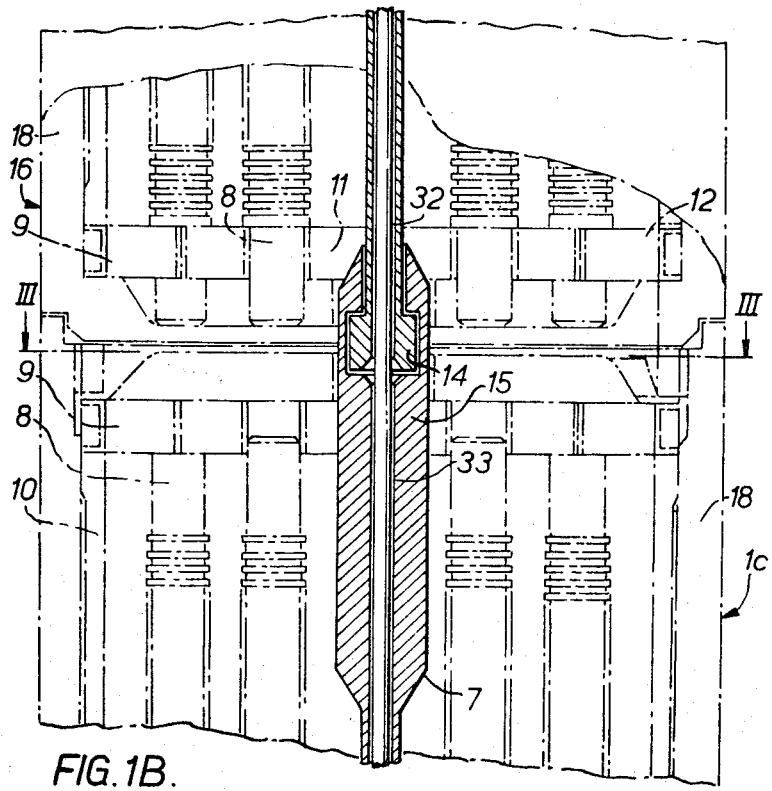
FIG.1B.
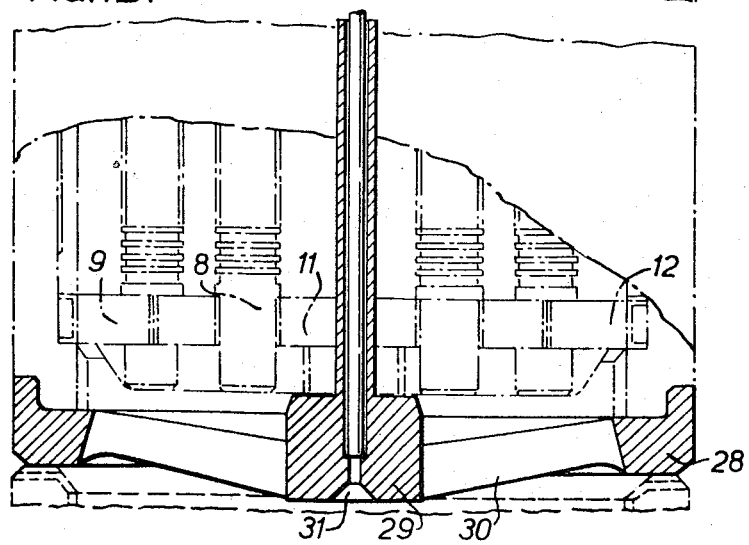

3,287,230
NUCLEAR FUEL ELEMENT STRINGER ASSEMBLY WITH IMPROVED COUPLING DEVICE
Ernest Edward Jerkins and Donald Garden Taylor, Culcheth, Warrington, England, assignors to United Kingdom Atomic Energy Authority, London, England
Filed Dec. 2, 1963, Ser. No. 327,216
Claims priority, application Great Britain, Dec. 10, 1962, 46,544/62
4 Claims. (Cl. 176—77)

This invention relates to fuel elements for nuclear reactors. In particular it relates to fuel element stacks which are linked together in the form of fuel stringers. Examples of fuel element stacks of this type are given in U.K. Patent No. 889,531.

In a nuclear reactor which has a cylindrical core there is an advantage in fuel economy to be gained, after the fuel has been in use for some time, by interchanging fuel element assemblies between reactive zones of high and low neutron flux. This is mainly due to the fuel in the channels of the central, high flux zone of the core being consumed more rapidly than that in the outer, low flux zone. This effect of consumption or "burn-up" varies radially across the core and also in an axial direction— the burn-up of the central region being greater than that of the outer regions over a given time interval. The system whereby element assemblies of differing burn-up are interchanged is termed "shuffling." Radial shuffling with vertically orientated stringer type elements is not unduly difficult though a large but necessarily portable shielded container is needed for transferring the stringers from channel to channel. Axial shuffling, however, requires that individual element assemblies of a stringer should be separated and reassembled which involves remote handling problems because of the high radioactivity of the element assemblies.

A fuel stringer according to the invention comprises end stacked fuel element assemblies which are made up of clusters of sheathed nuclear fuel members of elongate form and are fed together onto a rod for lifting and lowering of the stringer as a unit, the rod comprising a series of outer tubular members and withdrawable inner locking means, the tubular members being linked together by demountable coupling means and secured in the coupled position by the inner locking means so that on withdrawal of the inner locking means the fuel elements forming the stringer may be separated.

Figure 1A:
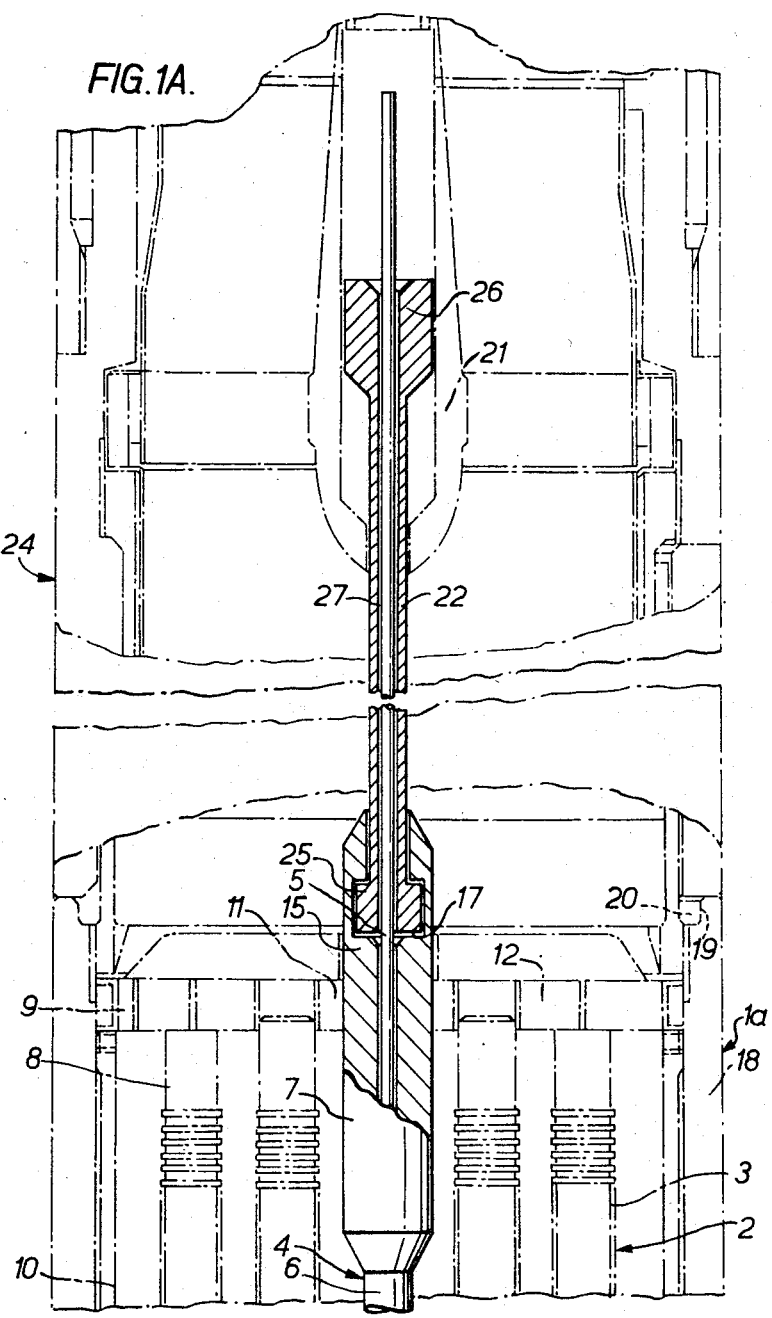
Figure 2:
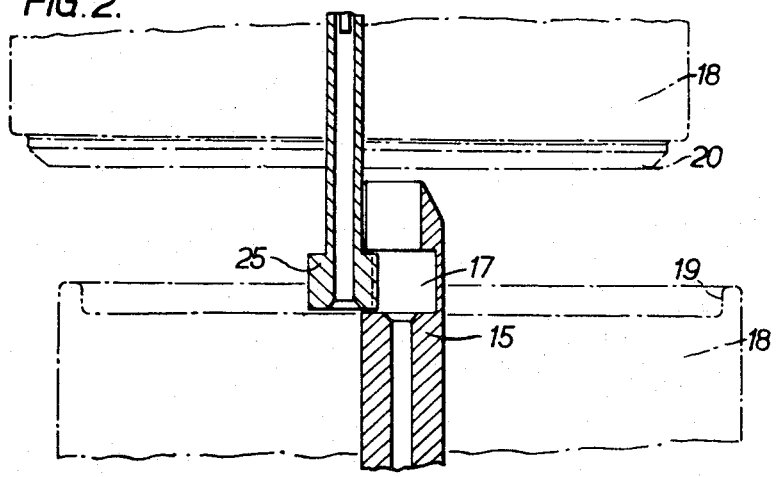
Figure 3:
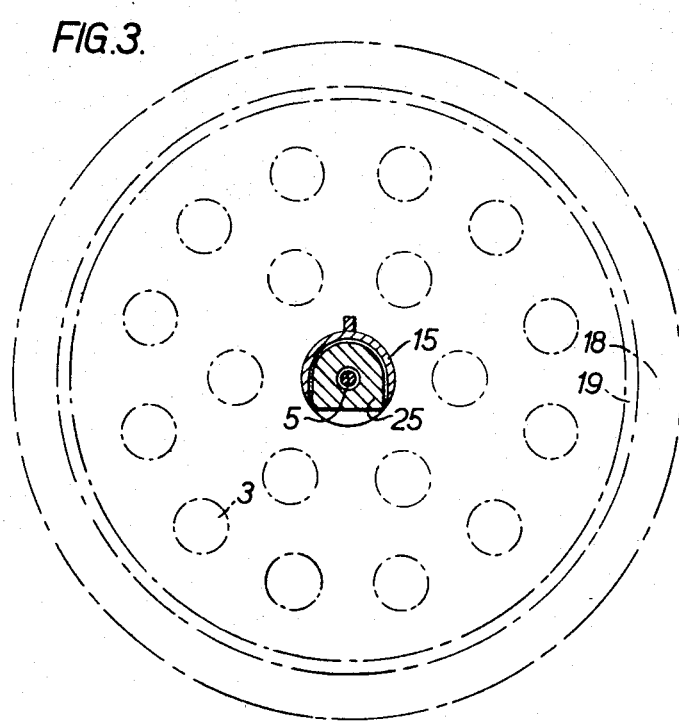

A constructional example embodying the invention will now be described with reference to the drawings wherein:

FIGURES 1A and 1B together form a side view in medial section split into two parts;

FIGURE 2 is a side view in medial section at right angles to FIGURES 1A or 1B; and FIGURE 3 is a section on the line III—III of FIGURE 1B.

FIGURES 1A and 1B of the drawings show a fuel stringer comprising end stacked fuel element assemblies 1a, 1b, 1c, etc. each made up of clusters 2 of sheathed nuclear fuel members 3. The fuel element assemblies are fed onto a generally cylindrical stainless steel rod 4 consisting of a series of tubular members 6 linked together by couplings 7 and inner locking means comprising a rod 5. The fuel members 3 carry end plugs 8 by which they are located at both ends in support plates 9. The plates 9 are spaced apart by annular graphite spacers 10 so that the weight of the fuel members 3 is carried by the support plates 9 at their lower ends and their upper ends are free to expand. The support plates 9 each have a central aperture 11 and a number of other apertures 12 which allow coolant to flow in contact with the fuel members 3. The rod 4 is fed through the central aperture 11, the rod being a sliding fit therein, capable of axial movement relative to the stringer. Each of the fuel element assemblies 1a, 1b, 1c has a separate tubular member 6 with a boss 14 at the lower end (except on the lowermost tubular member) and a boss 15 at its upper end. The bosses 14, 15 form the coupling 7. The boss 14 is in the form of a T-shaped head (shown variously positioned in FIGURES 1, 2 and 3) which fits into a recess 17 in the complementary upper boss 15 of the fuel element assembly situated below the boss 14. The fuel element assemblies 1a, 1b, 1c are each surrounded by a graphite sleeve 18. The sleeves 18 are spigotted so that a recess 19 at the top of one sleeve receives the spigot end 20 of the sleeve above it (shown more clearly in FIGURE 2). At the top of the stringer is a holding device 21 for an extension piece 22 coupled to the topmost tubular member 6. The extension piece 22 which extends through a distance piece 24 has a T-fitment 25 at its lower end of the same type as the boss 14. At the upper end of the extension piece 22 is a block 26 which fits into the holding device 21, the block 26 being free to slide axially in the holding device 21. The extension piece 22 and block 26 have a bore 27 concentric with the tubular members 6. At the bottom of the stringer is a support ring 28. The tubular member 6 of the bottom fuel element in the stringer is secured to this support ring 28 via a central boss 29 and webs 30. The central boss 29 has a central hole 31 for the inner rod 5 which passes through the tubular member 6 bores 32, 33 of the bosses 14, 15 and bore 27 of the extension piece 22 and block 26. The complete stringer can be lifted by means of the holding device 21 or an attachment thereto, the weight of the complete stringer being taken on the support ring 28.

A fuel stringer comprising a number of fuel element assemblies 1a, 1b, 1c, etc. is assembled by feeding tubular members 6 through apertures 11 in the support plates 9 and engaging bosses 14 with bosses 15, the lowermost fuel element assembly being provided with the tubular member 6 carrying the support ring 28. The extension piece 22 and holding device 21 are then fitted at the top of the stringer and the inner rod 5 is inserted to lock the bosses 14, 15 together. The stringer is now ready to be loaded into a fuel element channel in a nuclear reactor, suitable reflector and moderator assemblies being added at the upper and lower ends of the stringer if required.

To disassemble a fuel element stringer it is first removed from the reactor. The rod 5 is then withdrawn by remote means as the stringer will be highly radioactive. The fuel element assemblies can then be separated by sliding the holding device 21 along the extension piece 22 to a point where the holding device 21 is as far away from the topmost fuel element 1a as is possible. The assemblies 1a, 1b, 1c, etc. may then be moved about to separate the spigotted ends one from another and so permit the connected fitments 14, 15 to be separated by relative movement sideways. In this way assemblies can be shuffled and reassembled as desired. The sliding motion necessary for the separation and reassembly of the assemblies is mainly a sliding one which can be carried out remotely by reasonably simple means.

The inner locking means need not be a continuous rod 5 as shown. It may comprise a number of short rods inserted end to end into the hollow tubular members 6, the rods being made of such length as to avoid a break between them occurring at a point where tubular members are connected by a demountable coupling. The inner locking means may also comprise a continuous length of flexible metallic cable to occupy the hollow tubular member. In either case shielded housing to contain a radioactive stringer need only be longer than the length of a stringer by an amount necessary to remove a single short rod or a short length of flexible cable (which can be bent back over the length of the stringer as it is withdrawn from the tubular members). The alternative to this, in the case of a continuous inner rod as described in the specific embodiment, is to build a shielded enclosure of twice the length of the stringer to enable the rod to be fully withdrawn.

We claim:

1. A fuel element stringer comprising end stacked fuel element assemblies, each fuel element assembly comprising an upright disposed sleeve, a cluster of elongate fuel members disposed upright in parallel array within the sleeve, means carried by said sleeve to support the fuel members, a tubular member slidably retained by the means carried by said sleeve to support the fuel members, said tubular member being coaxial with said sleeve, and hollow coupling means at each end of each tubular member, said stringer comprising said fuel members joined end to end by said coupling means, and withdrawable inner locking means within said tubular members extending through said hollow coupling means to secure them in the coupled position.

2. A fuel stringer according to claim 1, wherein the locking means comprises a flexible cable.

3. A fuel stringer accordng to claim 1, wherein the locking means comprises a number of short rods the length of said short rods being different from the length of the tubular members.

4. A fuel stringer according to claim 1, wherein the coupling means comprises a boss provided at each end of each of the tubular members, the boss at one end being adapted to locate and slidably receive the complementary boss at the other end of the adjacent tubular member in the stringer.

References Cited by the Examiner
FOREIGN PATENTS

| | | |
|---|---|---|
| 662,230 | 4/1963 | Canada. |
| 1,246,699 | 10/1960 | France. |
| 907,344 | 11/1960 | Great Britain. |

L. DEWAYNE RUTLEDGE, *Primary Examiner.*

CARL D. QUARFORTH, *Examiner.*

H. E. BEHREND, *Assistant Examiner.*